(12) United States Patent
Shenhui et al.

(10) Patent No.: US 11,054,299 B2
(45) Date of Patent: Jul. 6, 2021

(54) WEIGHING DEVICE WITH MULTIPLE WEIGHING SENSORS

(71) Applicants: Mettler-Toledo (Changzhou) Precision Instruments Co., Ltd., Changzhou (CN); Mettler-Toledo (Changzhou) Measurement Technology Co., Ltd., Changzhou (CN); Mettler-Toledo International Trading (Shanghai) Co., Ltd., Shanghai (CN)

(72) Inventors: Wang Shenhui, Changzhou (CN); Chen Dengyou, Changzhou (CN); Zhang Song, Changzhou (CN); Sun Qin, Changzhou (CN)

(73) Assignees: Mettler-Toledo (Changzhou) Precision instruments Co., Ltd., Changzhou (CN); Mettler-Toledo (Changzhou) Measurement Technology Co., Ltd., Changzhou (CN); Mettler-Toledo International Trading (Shanghai) Co., Ltd., Shanghai (CN)

( * ) Notice: Subject to any disclaimer, the term of this patent is extended or adjusted under 35 U.S.C. 154(b) by 87 days.

(21) Appl. No.: 16/456,786

(22) Filed: Jun. 28, 2019

(65) Prior Publication Data

US 2020/0003610 A1    Jan. 2, 2020

(30) Foreign Application Priority Data

Jun. 29, 2018 (CN) .......................... 201810714116.X (51) Int. Cl.
*G01G 21/23* (2006.01)
(52) U.S. Cl.
CPC .................................. *G01G 21/23* (2013.01)

(58) Field of Classification Search
CPC ........ G01G 23/05; G01G 21/02; G01G 21/28; G01G 21/23
(Continued)

(56) References Cited

U.S. PATENT DOCUMENTS 4,313,509 A * 2/1982 Engels ..................... G01G 3/16
177/50
9,046,408 B2 * 6/2015 Chan ..................... G01G 21/23
(Continued)

FOREIGN PATENT DOCUMENTS

| CN | 110743463 | * | 2/2020 | |
| DE | 3030019 A1 | * | 3/1982 | ............. G01G 21/18 |

(Continued)

OTHER PUBLICATIONS

Impacts of geological conditions on instability causes and mechanical behavior of large-scale tunnels: a case study from the Sichuan-Tibet highway, China, Ziquan Chen1 et al. (Year: 2020).*

(Continued)

*Primary Examiner* — Jacques M Saint Surin
(74) *Attorney, Agent, or Firm* — Standley Law Group LLP; Jeffrey S. Standley; Stephen L. Grant (57) ABSTRACT

A weighing device (1) has a load-bearing portion (10) that supports an object being weighed, a plurality of transition portions (20), and a separation portion (30). The transition portions are positioned on the separation portion, and the load-bearing portion is positioned on the transition portions, with the transition portions connected to the load-bearing portion and the separation portion. A plurality of weighing sensors (40) are provided at a bottom of the separation portion. A support portion (50) is below the weighing sensors to provide support therefor. The weighing device simplifies the loading condition of weighing sensors and isolates the horizontal mechanical deformation/distortion of (Continued)

the weighing load-bearing mechanism. It also reduces the influence of mechanical deformation/distortion, thereby improving the weighing performance and the effectiveness of the weighing device.

18 Claims, 4 Drawing Sheets

(58) Field of Classification Search
USPC .......................................................... 177/255
See application file for complete search history.

(56) References Cited

U.S. PATENT DOCUMENTS

| | | | | |
|---|---|---|---|---|
| 10,064,502 | B1* | 9/2018 | Schellentrager | H04W 4/80 |
| 10,126,161 | B2* | 11/2018 | Izumo | G01G 23/02 |
| 10,139,264 | B2* | 11/2018 | Lustenberger | B62D 33/02 |
| 2010/0155152 | A1* | 6/2010 | Weichao | G01G 3/14 |
| | | | | 177/211 |
| 2012/0061150 | A1* | 3/2012 | Coulombe | G01G 21/23 |
| | | | | 177/54 |
| 2012/0279787 | A1* | 11/2012 | Huebler | G01G 19/005 |
| | | | | 177/145 |
| 2014/0014415 | A1* | 1/2014 | Stovern | G01G 19/02 |
| | | | | 177/133 |
| 2016/0103011 | A1* | 4/2016 | Lustenberger | F16L 3/18 |
| | | | | 73/862.637 |

FOREIGN PATENT DOCUMENTS

| | | | | |
|---|---|---|---|---|
| DE | 3408071 | * | 9/1985 | ............. G01G 19/14 |
| FR | 2436373 | * | 11/1980 | ........... G01G 3/1412 |
| WO | WO2017133582 A1 | * | 8/2017 | ............. G01G 21/02 |

OTHER PUBLICATIONS

Evaluation of the residual load bearing capacity of civil structures using fuzzy logic & decision analysis (Year: 2015).*

* cited by examiner

WEIGHING DEVICE WITH MULTIPLE WEIGHING SENSORS

CROSS-REFERENCE TO RELATED APPLICATIONS

This application claims priority to Chinese Patent Application No. 201810714116.X, filed on 29 Jun. 2018, which is incorporated by reference as if fully recited herein.

TECHNICAL FIELD

This invention relates to the field of weighing devices, and in particular to a weighing device with multiple weighing sensors.

BACKGROUND ART

In the prior art weighing application process of a multi-sensor weighing device, the mechanical weighing structure undergoes deformation/distortion due to changes in the weighing load or due to long-term use of said mechanical weighing structure.

Due to deformation/distortion of the mechanical weighing structure, the stress state of the weighing sensor in the weighing device differs significantly in comparison to the stress state of the weighing sensor of the weighing device under calibration, resulting in the introduction of a certain weighing error into the weighing application process, which in turn reduces the weighing application precision and effectiveness of the weighing device.

The existing weighing structure is usually divided into three layers: the lowermost layer is a support layer for supporting and fixing the weighing sensor; the middle layer is a weighing sensor layer, the weighing sensor being mounted on the support layer; and the uppermost layer is a weighing load-bearing layer, which is mounted on the weighing sensor layer, and is connected to the weighing sensor via a fixed or movable mechanism.

While using the existing weighing structure, due to the differences in size and position of the weighing load and the difference in force distribution, the mechanical deformation or distortion of a weighing load-bearing part is complex, which makes it difficult to analyse and control the stress state of the weighing sensor in a weighing mechanism, which in turn makes it difficult to eliminate the influence of deformation or distortion of the weighing structure on the measured load value; and since the deformation of the weighing load-bearing part directly acts on the weighing sensor, the complex deformation or distortion of the weighing load-bearing part affects the stress state of the weighing sensor in a horizontal direction, thus introducing the undesirable weighing error.

Therefore, the reduced complexity of the deformation/distortion of the mechanical weighing structure and the reduced influence of the horizontal deformation or distortion of the weighing load-bearing on the stress state of the weighing sensor will improve the weighing precision and effective utilization of the weighing product.

SUMMARY OF INVENTION

The technical problem to be solved by the present invention is to provide a weighing device in order to overcome the defects associated with the prior art weighing mechanism structure that is easily deformed/distorted.

The present invention solves the above technical problem by the use of a weighing device comprising a load-bearing portion for supporting an object to be weighed. The weighing device also comprising a plurality of transition portions and a separation portion. The transition portions are positioned on the separation portion, the load-bearing portion positioned on the transition portions respectively. The transition portions are connected to the load-bearing portion and the separation portion. The weighing device further comprising a plurality of weighing sensors positioned below the separation portion, and a support portion positioned below the weighing sensors for supporting the weighing sensors. The inventive weighing device reduces the influence of horizontal mechanical deformation/distortion of the load-bearing mechanism on the stress state of the weighing sensors.

According to an embodiment of the present invention, the weighing device contains at least three weighing sensors. Providing at least three weighing sensors increases the precision of the weighing device. It must be noted that more the number of weighing sensors higher the reliability and consistency of the measured weight value.

In a preferred embodiment of the present invention, the transition portions are made of an elastic material. Using elastic material improves flexibility of the transition portions and minimizes the influence of horizontal deformation/distortion of the load-bearing mechanism on the measured weight value of the object to be weighed.

According to an embodiment of the present invention, the transition portions are fixedly connected to the load-bearing portion and the separation portion. Connecting the transition portions fixedly to the load-bearing portion and the separation portion will make the three-part assembly integral besides increasing the bearing capacity and mechanical strength of the weighing device.

According to an embodiment of the present invention, the transition portions take the form of a movable mechanism, which comprises an upper movable portion and a lower movable portion, wherein the upper movable portion is fixedly connected to the bottom of the load-bearing portion, and the lower movable portion is fixedly connected to the top of the separation portion; and a lower end surface of the upper movable portion comprising a concave surface, an upper end surface of the lower movable portion comprising a spherical surface, the spherical surface and the concave surface are matched with each other, and a relative motion between the load-bearing portion and the separation portion is formed by means of the upper movable portion and the lower movable portion through a relative motion between the spherical surface and the concave surface. The transition portions in the form of a movable mechanism provides relative movement between the load-bearing portion and the separation portion. Such an arrangement improves handling of the weighing device besides easing the repair, replacement, maintenance, and service of load-bearing portion and separation portion.

In an advantageous embodiment of the present invention, the transition portions take the form of a movable mechanism, which comprises an upper connection portion, a movable portion and a lower connection portion, wherein the upper connection portion is fixedly connected to the bottom of the load-bearing portion, and the lower connection portion is fixedly connected to the top of the weighing separation portion; and the movable portion is interposed between the upper connection portion and the lower connection portion, and the movable portion is in a rolling connection with the upper connection portion and the lower connection portion to form a relative movement between the load-bearing portion and the separation portion. The transition portions in the form of a movable mechanism in the instant embodiment offers several advantages and principal among them is the smooth operation resulting from the rolling connection between the upper connection portion and the lower connection portion provided by the movable portion. The movable arrangement is also modular in its configuration thereby supporting easy replacement of specific worn-out components instead of the whole assembly.

According to an embodiment of the present invention, a lower end surface of the upper connection portion is provided with a first groove, an upper end surface of the lower connection portion is provided with a second groove, the movable portion is a first cylinder having two end surfaces, namely upper and lower, wherein said end surfaces of the first cylinder are first arc-shaped surfaces, and the first arc-shaped surfaces correspondingly match the first groove and the second groove, respectively. The first arc-shaped surfaces and the corresponding first and second grooves interact smoothly and has a positive influence on the operating life of the movable mechanism.

According to an embodiment of the present invention, a lower end surface of the upper connection portion is provided with an inner first arc-shaped groove, an upper end surface of the lower connection portion is configured to be a first flat surface, the movable portion is configured to be a second cylinder, an upper end surface of the second cylinder is configured to be a second arc-shaped surface and a lower end surface thereof is configured to be a second flat surface, the second arc-shaped surface correspondingly matches the first arc-shaped groove, and the second flat surface correspondingly matches the first flat surface. This advantageous embodiment is easy to manufacture and contains fewer components while offering a smooth and seamless relative movement between load-bearing portion and separation portion.

According to an embodiment of the present invention, a lower end surface of the upper connection portion is provided with an inner second arc-shaped groove, an upper end surface of the lower connection portion is provided with a third arc-shaped groove, the movable portion is configured to be a spherical body, and the spherical body correspondingly matches the second arc-shaped groove and the third arc-shaped groove. As the movable portion is configured to be a spherical body, this embodiment offers the least resistance for the movement of load-bearing portion relative to the separation portion. The arrangement proposed in this embodiment is cost effective, easy to manufacture, and also offers a smoother operating experience to the user of the weighing device. As the movable portion in the instant embodiment is a spherical body, the failure rates are low due to reduced friction amongst the interacting components.

According to an embodiment of the present invention, the separation portion is polygonal. A polygonal separation portion is well suited for a weighing device having a polygonal shaped weighing platform.

According to an embodiment of the present invention, the separation portion is circular, and the plurality of transition portions are evenly distributed on the separation portion near an outer edge thereof. The arrangement of transition portions evenly on a circular separation portion allows the release of horizontal stress more effectively.

According to an embodiment of the present invention, the transition portions are located above stress points of the weighing sensors. This arrangement reduces the influence of horizontal mechanical deformation/distortion of the load-bearing portion on the stress state of the weighing sensor.

According to an embodiment of the present invention, the separation portion is of a hollow frame structure. The transition portions absorb much of the deformation-causing or distortion-causing horizontal force acting on the load-bearing portion. It is therefore prudent to form the separation portion as a hollow frame structure. The frame structure of the separation portion is configured in such way that it offers less or no resistance to vertical force deformation acting on the load-bearing portion and transfers the same magnitude of the vertical force to the weighing sensors. On the contrary, the frame structure is expected to offer a certain minimum resistance to deformation induced by horizontal force.

According to an embodiment of the present invention, each side of the frame structure is provided with an inwardly-recessed curved portion. The inwardly-recessed curved portion increases the elasticity of the frame structure.

According to an embodiment of the present invention, the separation portion is fixedly or movably connected to the weighing sensors. A fixed connection between the separation portion and the weighing sensors ensures accurate transfer of vertical forces induced due to the weight of the object. On the other hand, a movable connection between the separation portion and the weighing sensors improves access to the weighing sensors for the purpose of repair, replacement, maintenance, and servicing.

BRIEF DESCRIPTION OF DRAWINGS

The above-mentioned and other features, properties and advantages of the present invention will become more apparent from the following description of the embodiments with reference to the accompanying drawings, and the same reference numerals denote the same features throughout the figures, in which.

DESCRIPTION OF EMBODIMENTS

To make the above objects, features and advantages of the present invention more apparent and easier to understand, particular embodiments of the present invention are described in detail below with reference to the accompanying drawings.

Embodiments of the present invention will now be described in detail with reference to the accompanying drawings. Reference will now be made in detail to preferred embodiments of the present invention, examples of which are illustrated in the accompanying drawings. The same reference numerals used in all the figures denote identical or similar parts wherever possible.

Furthermore, although the terms used in the present invention are selected from well-known common terms, some of the terms mentioned in the description of the present invention may have been selected by the applicant according to his or her determination, and the detailed meaning thereof is described in the relevant section described herein.

Furthermore, the invention must be understood, not simply by the actual terms used but also by the meanings encompassed by each term.

First Embodiment

Figure 1:
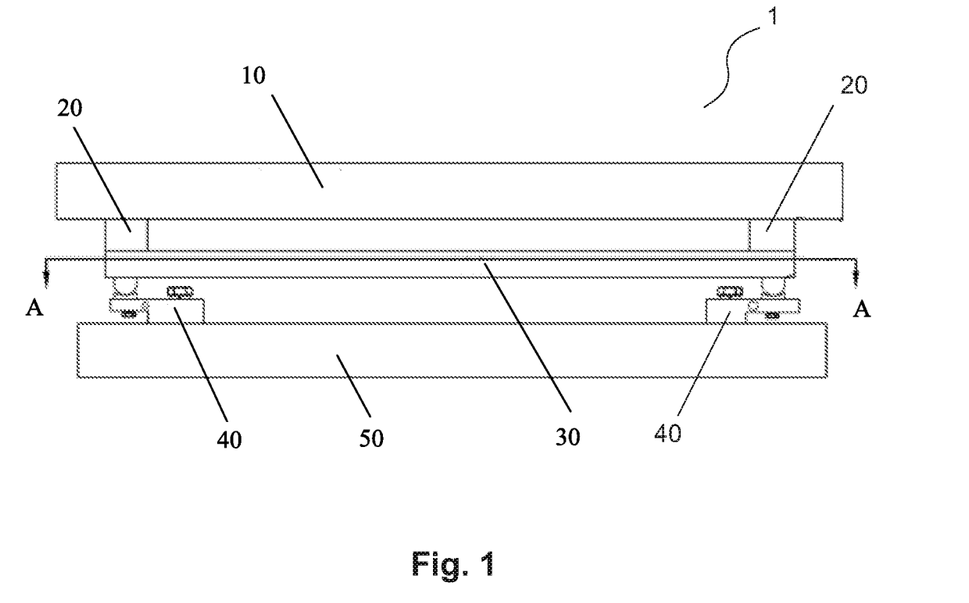
FIG. 1 is a structural schematic view of a first embodiment of a sensor weighing device of the present invention.
Figure 2:
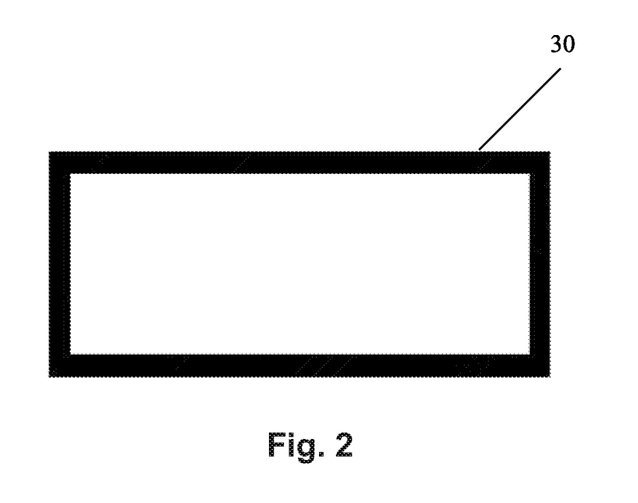
FIG. 2 is a sectional view taken along line A-A in FIG. 1.

FIG. 1 is a structural schematic view of a first embodiment of a weighing device (1) of the present invention. FIG. 2 is a sectional view taken along line A-A in FIG. 1.

As shown in FIGS. 1 and 2, the present invention discloses a sensor weighing device (1), which specifically comprises a load-bearing portion 10, a plurality of transition portions 20, a separation portion 30, a plurality of weighing sensors 40, and a support portion 50, the load-bearing portion 10 being mainly used to support an object to be weighed. The transition portions 20 are respectively provided on the separation portion 30, and the load-bearing portion 10 is provided on the transition portions 20 such that the transition portions 20 are connected to the load-bearing portion 10 and the separation portion 30, and also transmits a weighing loaded force to the separation portion 30. The weighing sensors 40 are provided at the bottom of the separation portion 30 for supporting the separation portion 30. The support portion 50 is provided below the weighing sensors 40 for supporting the weighing sensors 40, which are essential weighing parts.

Preferably, the separation portion 30 is in the shape of a polygon, and the plurality of transition portions 20 are respectively provided on respective vertices of the separation portion 30. Alternatively, the separation portion 30 is circular, and the plurality of transition portions 20 are evenly distributed on the separation portion 30 near an outer edge thereof. The shape of the polygon is determined by the positional distribution of the weighing sensors 40.

Further preferably, the separation portion 30 in this embodiment is configured to be of a hollow frame structure. At the positions of the weighing sensors 40, the separation portion 30 has a frame structure that requires no/less resistance to vertical force deformation but requires a certain resistance to horizontal force deformation. The frame of the separation portion 30 requires a lower resistance to horizontal deformation than the above design requirements.

Still further preferably, the transition portions 20 are distributed on top of the separation portion 30 corresponding to the positions of the weighing sensors 40. The transition portions 20 are made of a flexible and soft material such as an elastic material, for example, the transition portions 20 are preferably a rubber transition block. The rubber transition block may be rectangular, circular or polygonal, and the shape thereof is selected according to the shapes of the load-bearing portion 10 and the separation portion 30. The transition portions 20 are fixedly connected to the load-bearing portion 10 and the separation portion 30, for example, the rubber transition block is glued to the load-bearing portion 10 and the separation portion 30. Alternatively, the transition portions 20 in this embodiment may also take the form of a spring or a steel ball.

The above structure may be configured such that, for example, the load-bearing portion 10 is configured to be a rectangular, such as square, flat plate, and the separation portion 30 is configured to be of a rectangular frame structure, and the structural strength thereof is determined by the capacity of a scale. The transition portions 20 use four rectangular rubber transition blocks, such as cube-shaped rubber blocks, the size and thickness of which are determined by the capacity of the scale. The rubber transition block is glued to the load-bearing portion 10 and the separation portion 30. By way of example, in this embodiment, as shown in FIG. 2, four rubber transition blocks are distributed on top of the four corners of the frame structure of the separation portion 30, and at the same time, four weighing sensors 40 corresponding thereto are used, the weighing sensors 40 being provided under the four corners of the frame structure of the separation portion 30. In this embodiment, the weighing sensors 40 and the frame structure of the separation portion 30 are connected via a movable structure, the weighing sensors 40 and the support portion 50 are connected via bolts, and the support portion 50 here may preferably have a rectangular projection on a horizontal plane.

In this embodiment, there are at least three weighing sensors 40, the transition portions 20 are located above stress points of the weighing sensors 40, and the weighing sensors 40 here should be of the same type.

Second Embodiment

Figure 3:
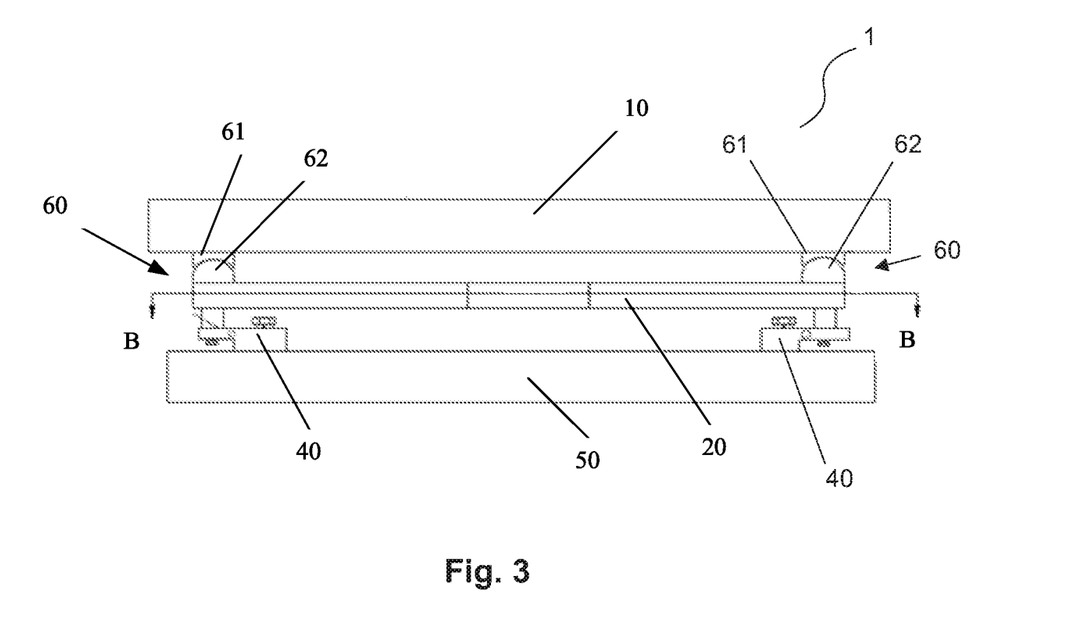
FIG. 3 is a structural schematic view of a second embodiment of a sensor weighing device of the present invention.
Figure 4:
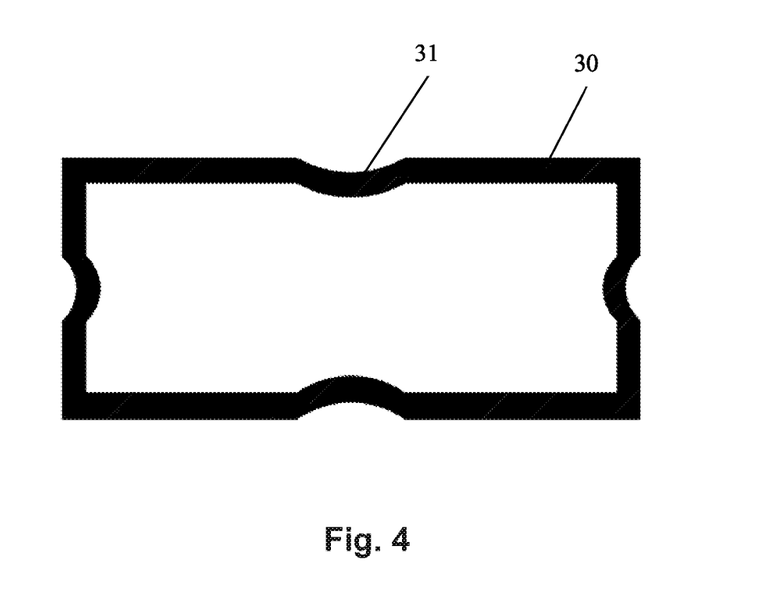
FIG. 4 is a sectional view taken along line B-B in FIG. 3.

FIG. 3 is a structural schematic view of a second embodiment of a sensor weighing device (1) of the present invention. FIG. 4 is a sectional view taken along line B-B in FIG. 3.

As shown in FIGS. 3 and 4, the structure of this embodiment is substantially the same as that of the first embodiment, except that the transition portion takes the form of a movable mechanism 60, and the movable mechanism 60 comprises an upper movable portion 61 and a lower movable portion 62, wherein the upper movable portion 61 is fixedly connected to the bottom of the load-bearing portion 10, and the lower movable portion 62 is fixedly connected to the top of the separation portion 30.

At the same time, a lower end surface of the upper movable portion 61 is configured to be a concave surface, and an upper end surface of the lower movable portion 62 is configured to be a spherical surface, wherein the spherical surface and the concave surface are matched with each other, and a relative motion between the load-bearing portion 10 and the separation portion 30 is formed by means of the upper movable portion 61 and the lower movable portion 62 through a relative motion between the spherical surface and the concave surface. The movable mechanism has a horizontally self-restoring capability.

The above structure may be configured such that, for example, the load-bearing portion 10 is configured to be a rectangular flat plate, and the separation portion 30 is configured to be of a rectangular frame structure, and the structural strength thereof is determined by the capacity of a scale. The transition portion takes the form of the above movable mechanism 60, the size and thickness of which are determined by the capacity of the scale. The movable mechanism 60 is fixedly connected to the load-bearing portion 10 and the separation portion 30. By way of example, in this embodiment, the transition portions use four movable mechanisms 60, and the movable mechanisms 60 are connected, by welding, to the load-bearing portion 10 and the separation portion 30.

In this embodiment, there are at least three weighing sensors 40, the movable mechanisms 60 are located above stress points of the weighing sensors 40, and the weighing sensors 40 here should be of the same type.

Third Embodiment

Figure 5:
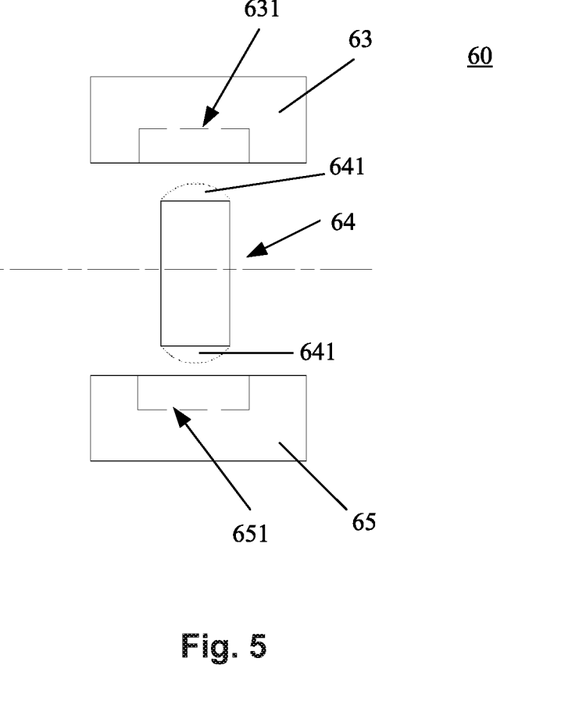
FIG. 5 is a structural schematic view of a third embodiment of a sensor weighing device of the present invention.

FIG. 5 is a structural schematic view of a third embodiment of a sensor weighing device (1) of the present invention.

As shown in FIG. 5, the structure of this embodiment is substantially the same as that of the second embodiment, except that the transition portion takes the form of a movable mechanism 60, and the movable mechanism 60 comprises an upper connection portion 63, a movable portion 64 and a lower connection portion 65, wherein the upper connection portion 63 is fixedly connected to the bottom of the load-bearing portion 10, and the lower connection portion 65 is fixedly connected to the top of the separation portion 30. The movable portion 64 is interposed between the upper connection portion 63 and the lower connection portion 65, and the movable portion 64 is in a rolling connection with the upper connection portion 63 and the lower connection portion 65 to form a relative movement between the load-bearing portion 10 and the separation portion 30. The movable mechanism has a horizontally self-restoring capability.

Specifically, in this embodiment, a lower end surface of the upper connection portion 63 is provided with a first groove 631, an upper end surface of the lower connection portion 65 is provided with a second groove 651, the movable portion 64 is a first cylinder, two, namely upper and lower, end surfaces of the first cylinder are first arc-shaped surfaces 641, and the first arc-shaped surfaces 641 correspondingly match the first groove 631 and the second groove 651, respectively.

Fourth Embodiment

Figure 6:
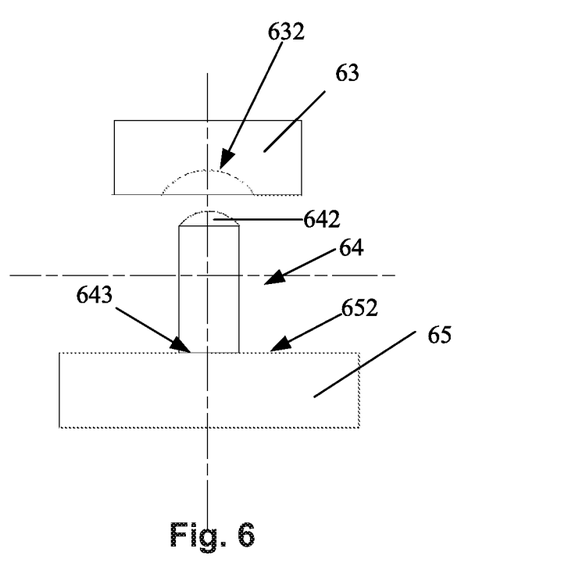
FIG. 6 is a structural schematic view of a fourth embodiment of a sensor weighing device of the present invention.

FIG. 6 is a structural schematic view of a fourth embodiment of a sensor weighing device (1) of the present invention.

As shown in FIG. 6, the structure of this embodiment is substantially the same as that of the third embodiment, except that in this embodiment, the lower end surface of the upper connection portion 63 is provided with an inner first arc-shaped groove 632, the upper end surface of the lower connection portion 65 is configured to be a first flat surface 652, the movable portion 64 is configured to be a second cylinder, an upper end surface of the second cylinder is configured to be a second arc-shaped surface 642 and a lower end surface thereof is configured to be a second flat surface 643, the second arc-shaped surface 642 correspondingly matches the first arc-shaped groove 632, and the second flat surface 643 correspondingly matches the first flat surface 652.

Fifth Embodiment

Figure 7:
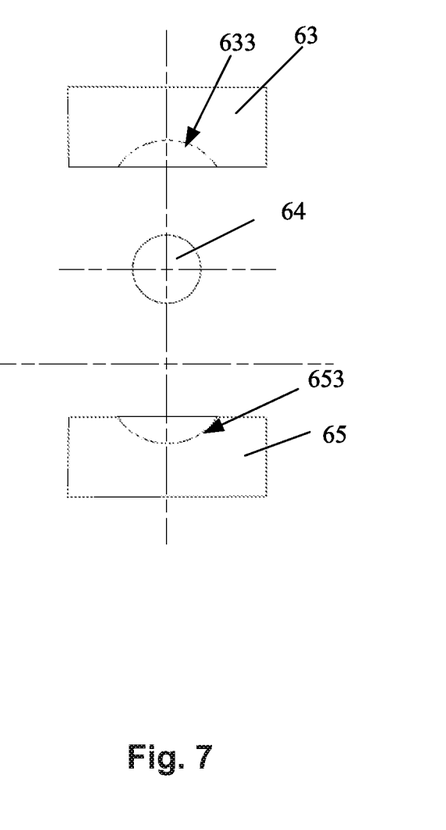
FIG. 7 is a structural schematic view of a fifth embodiment of a sensor weighing device of the present invention.

FIG. 7 is a structural schematic view of a fifth embodiment of a sensor weighing device (1) of the present invention.

As shown in FIG. 7, the structure of this embodiment is substantially the same as that of the third embodiment, except that in this embodiment, the lower end surface of the upper connection portion 63 is provided with an inner second arc-shaped groove 633, the upper end surface of the lower connection portion 65 is provided with a third arc-shaped groove 653, the movable portion 64 is configured to be a spherical body, and the spherical body correspondingly matches the second arc-shaped groove 633 and the third arc-shaped groove 653.

Of course, the structure of the movable mechanism in the second to fifth embodiments as described above is merely exemplary, and the solutions of the present application are not limited by the foregoing embodiments. The solutions of the present application can be implemented as long as the movable mechanism has the horizontally self-restoring function, and are all within the scope of protection of the present application. According to the structural description of the first to fifth embodiments as described above, the load-bearing portion 10 in the present invention has a certain application stiffness/strength to ensure that the weighing load-bearing part does not experience deformations that affect the application/visuality during weighing applications, thereby reducing the stiffness/strength requirements for the weighing load-bearing part.

In the present invention, the transition portions 20 are used to connect two parts, namely the load-bearing portion 10 and the separation portions 30, and reduce the horizontal deformation or distortion constraint on the load-bearing portion 10, so that the horizontal force applied to the separation portions 30 due to the horizontal deformation or distortion of the load-bearing portion 10 is reduced, and the weighing loaded force can be effectively transmitted to the separation portions 30, thereby simplifying the design of the weighing isolation part and reducing the design requirements of the separation portion 30.

The transition portions 20 are designed with a soft material or a movable mechanism to reduce the constraint between the load-bearing portion 10 and the separation portion 30, thereby reducing the distortion/deformation force introduced by the distortion/deformation of the load-bearing portion 10, and in turn reducing the influence of distortion/deformation of the load-bearing portion 10 on the separation portion 30.

Preferably, the surface stress on the separation portion 30 is converted into the point stress on the separation portion 30 by means of the distribution of the soft materials or the movable mechanisms, thereby simplifying the stress condition of the separation portion 30. Still further, the soft materials/movable mechanisms are distributed on top of or near the stress points of the weighing sensors 40 on the separation portion 30 to reduce the strength/stiffness requirements for the design of the separation portion 30. Of course, the transition portions 20 described herein is preferably of a structure having a certain self-restoring capability.

In the present invention, the separation portion 30 is of a frame structure. The separation portion 30 is mainly used to isolate the horizontal deformation and distortion of the weighing load-bearing mechanism from affecting the stress state of the weighing sensor, and to keep the stress state of the weighing sensor stable. Preferably, the shape of the frame structure of the separation portion 30 is determined by the positions of the stress points of the weighing sensors 40 and the point positions where the force is transferred from the transition portions 20 to the separation portion 30. The structural strength/stiffness of the frame structure of the separation portion 30 is determined by the positions of the stress points of the transition portions 20 and the positions of the stress points of the weighing sensors 40 as well as the weighing stress offset amount. The frame of the separation portion 30 requires a lower resistance to horizontal deformation than the above design requirements.

In this embodiment, each side of the frame structure of the separation portion 30 is provided with an inwardly-recessed curved portion 31 to increase the elasticity of the frame structure. In this embodiment, four movable mechanisms 60 are used, which are distributed on top of the four corners of the frame structure of the separation portion 30 shown in FIG. 3. At the same time, four weighing sensors 40 corresponding thereto are used, the weighing sensors 40 being provided under the four corners of the frame structure of the separation portion 30. In this embodiment, the weighing sensors 40 and the frame structure of the separation portion 30 are connected via a movable structure, the weighing sensors 40 and the support portion 50 are connected via bolts, and the support portion 50 here may preferably have a rectangular projection on a horizontal plane.

A plurality of weighing sensors 40 are provided in the present invention. The weighing sensors 40 are movably connected to the separation portion 30, and a frame with straight sides is preferably used, so that the frame structure of the separation portion 30 has a certain horizontal supporting force. Such a movable connection has a horizontally self-restoring capability. Alternatively, the weighing sensors 40 are fixedly connected to the separation portion 30, and a frame with curved sides is preferably used, so that the frame structure of the separation portion 30 can release the horizontal stress. In this embodiment, the support portion 50 is preferably fixedly connected to the weighing sensors 40.

When a weighing load or a weighing apparatus is used for a long time to cause deformation/distortion of the weighing load-bearing part, the deformation/distortion of the load-bearing portion 10 is transmitted to the weighing isolation part through the transition portions 20. Since the transition portions 20 are designed with a soft material, the horizontal influence of the complex mechanical deformation/distortion of the weighing load-bearing surface is released/reduced by the material deformation/structural deformation of the transition portions 20, thereby reducing the influence of the deformation/distortion of the load-bearing portion 10 on the separation portion 30.

Since the stress of the load-bearing part is transmitted to the separation portion 30 through the transition portions 20, the material/structural distribution of the transition portions 20 will change the stress mode of the separation portion 30, and in turn the stress condition of the isolation part can be simplified, thereby reducing the design requirements for the separation portion 30. Since the stress condition of the separation portion 30 is simple and clear, the isolation part can be designed to effectively reduce the amount of distortion/deformation of the weighing isolation part, and a targeted design can be implemented to reduce the influence of the distortion/deformation of the isolation part on the weighing application, so that the purpose of reducing the design requirements for the separation portion and effectively eliminating the influence of the deformation/distortion of the weighing structure on the weighing application is achieved.

In summary, the sensor weighing device (1) of the present invention simplifies the stress of the weighing sensor, isolates the deformation/distortion of the weighing structure, and reduces the influence of the deformation/distortion of the weighing structure on the stress state of the weighing sensor, thereby improving the weighing precision and the use effect of the weighing product.

Although the specific implementations of the present invention are described above, a person skilled in the art should understand that these are only exemplary, and the scope of protection of the present invention is defined by the appended claims. Various alterations or modifications to these embodiments can be made by a person skilled in the art without departing from the principle and essence of the present invention; however, these alterations and modifications all fall within the scope of protection of the present invention.

What is claimed is:

1. A device for weighing an object, comprising:
   a load-bearing portion to support an object being weighed;
   a support portion;
   a plurality of weighing sensors, supported by the support portion;
   a separation portion, positioned to bear upon the plurality of weighing sensors; and
   a plurality of transition portions, located between, and connected to, both the load bearing portion and the separation portion.

2. The device of claim 1, wherein there are at least three weighing sensors.

3. The device of claim 1, wherein the transition portions are made of an elastic material.

4. The device of claim 1, wherein the transition portions are fixedly connected to the load-bearing portion and the separation portion.

5. The device of claim 1, wherein the transition portions are configured as a movable mechanism comprising:
   an upper movable portion that is fixedly connected to a bottom of the load-bearing portion, with a lower end surface of the upper movable portion comprising a concave surface; and
   a lower movable portion that is fixedly connected to a top of the separation portion, with an upper end surface of the lower movable portion comprising a spherical surface, with the spherical surface matched with the concave surface are matched with each other, so that a relative motion between the load-bearing portion and the separation portion is formed by means of the upper movable portion and the lower movable portion through a relative motion between the spherical surface and the concave surface.

6. The device of claim 1, wherein the transition portions are configured as a movable mechanism comprising:
   an upper connection portion that is fixedly connected to a bottom of the load-bearing portion;
   a lower connection portion that is fixedly connected to a top of the separation portion; and
   a movable portion that is interposed between the upper connection portion and the lower connection portion, and the movable portion being in a rolling connection with each of the upper and lower connection portions, establishing a relative movement between the load-bearing portion and the separation portion.

7. The device of claim 6, wherein:
   a first groove is provided on a lower end surface of the upper connection portion; a second groove is provided on an upper end surface of the lower connection portion; and
   the movable portion is configured as a first cylinder having upper and lower end surfaces are first arc-shaped surfaces that correspond to the respective first and second grooves.

8. The device of claim 6, wherein:
   a first arc-shaped groove is provided on a lower end surface of the upper connection portion;
   a first flat surface is provided on an upper end surface of the lower connection portion; and
   the movable portion is configured as a second cylinder, an upper end surface of which is configured to be a second arc-shaped surface and a lower end surface of which is configured to be a second flat surface, so that the second arc-shaped surface correspondingly matches the first arc-shaped groove, and the second flat surface correspondingly matches the first flat surface.

9. The device of claim 6, wherein:
   an inner second arc-shaped groove is provided on a lower end surface of the upper connection portion;

a third arc-shaped groove is provided on an upper end surface of the lower connection portion; and the movable portion is configured as a spherical body, so that the spherical body correspondingly matches the inner second arc-shaped groove and the third arc-shaped groove.

10. The device of claim 1, wherein the separation portion is polygonal.

11. The device of claim 1, wherein the separation portion is circular, and the plurality of transition portions are evenly distributed on the separation portion near an outer edge thereof.

12. The device of claim 1, wherein the transition portions are located above stress points of the weighing sensors.

13. The device of claim 1, wherein the separation portion is of a hollow frame structure.

14. The device of claim 13, wherein each side of the frame structure is provided with an inwardly-recessed curved portion.

15. The device of claim 2, wherein the transition portions are fixedly connected to the load-bearing portion and the separation portion.

16. The device of claim 2, wherein the transition portions are configured as a movable mechanism comprising:

an upper movable portion that is fixedly connected to a bottom of the load-bearing portion, with a lower end surface of the upper movable portion comprising a concave surface; and a lower movable portion that is fixedly connected to a top of the separation portion, with an upper end surface of the lower movable portion comprising a spherical surface, with the spherical surface matched with the concave surface are matched with each other, so that a relative motion between the load-bearing portion and the separation portion is formed by means of the upper movable portion and the lower movable portion through a relative motion between the spherical surface and the concave surface.

17. The device of claim 2, wherein the transition portions are configured as a movable mechanism comprising:

an upper connection portion that is fixedly connected to a bottom of the load-bearing portion;

a lower connection portion that is fixedly connected to a top of the separation portion; and a movable portion that is interposed between the upper connection portion and the lower connection portion, and the movable portion being in a rolling connection with each of the upper and lower connection portions, establishing a relative movement between the load-bearing portion and the separation portion.

18. The device of claim 2, wherein the transition portions are located above stress points of the weighing sensors.

* * * * *